May 19, 1925. 1,538,503
A. A. ASPLUND
FUEL VALVE CONTROL WITH LEVER AND CONNECTIONS
Filed Feb. 17, 1920 5 Sheets-Sheet 3

Inventor
Axel A. Asplund
By Mason Fenwick & Lawrence,
Attorneys

May 19, 1925.　1,538,503
A. A. ASPLUND
FUEL VALVE CONTROL WITH LEVER AND CONNECTIONS
Filed Feb. 17, 1920　5 Sheets-Sheet 4
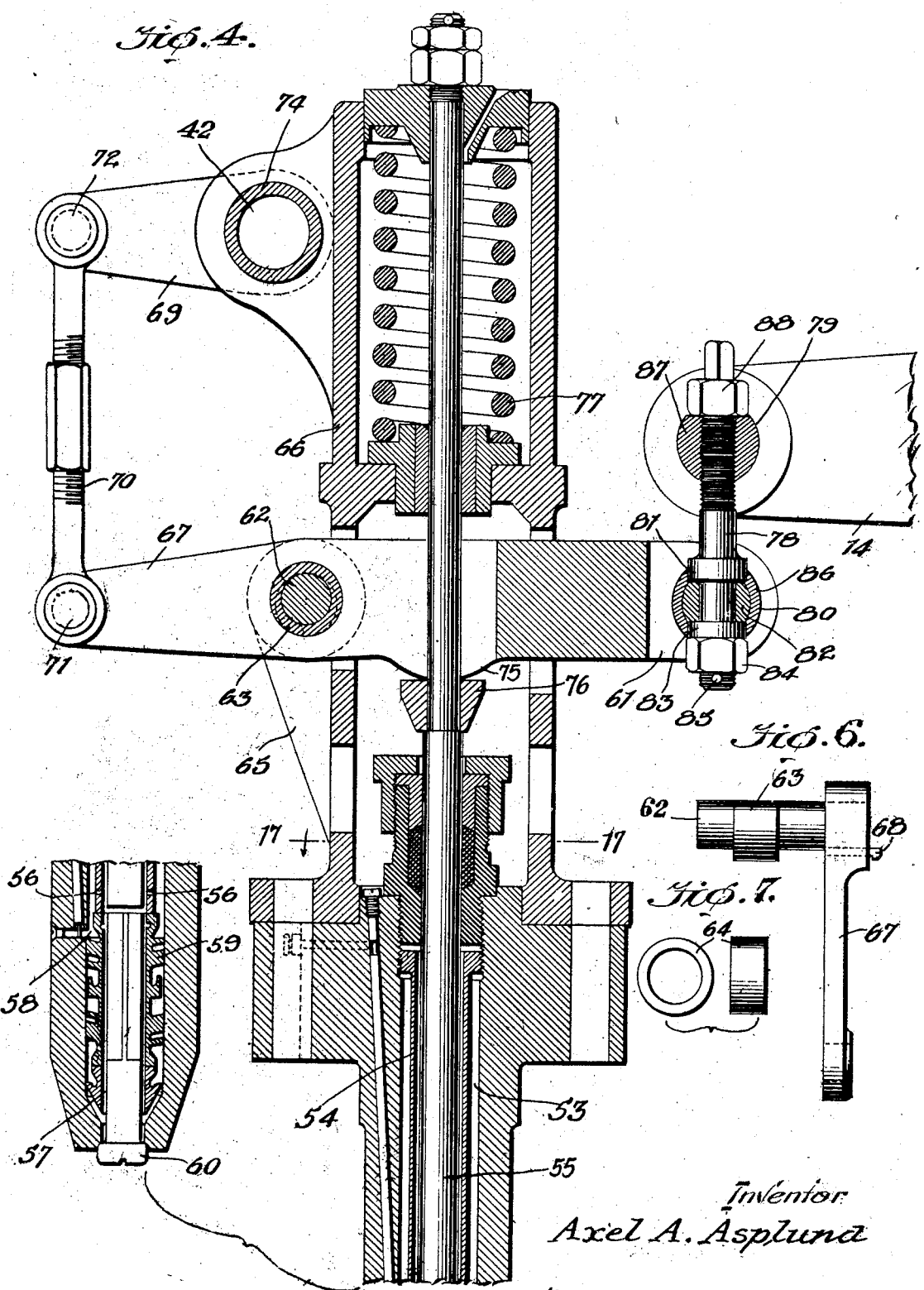

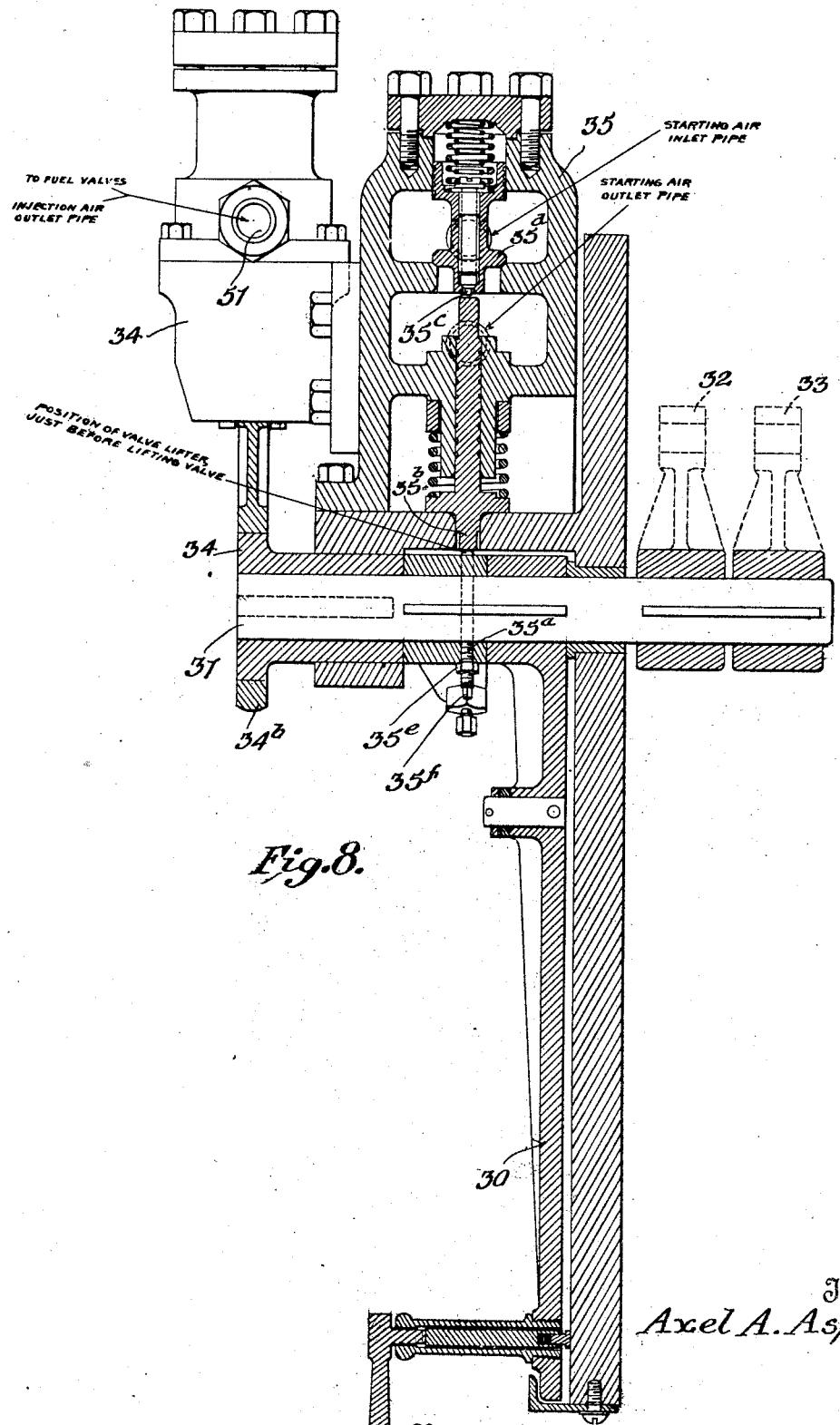

Patented May 19, 1925.

1,538,503

UNITED STATES PATENT OFFICE.

AXEL AUGUST ASPLUND, OF AUBURN, NEW YORK.

FUEL-VALVE CONTROL WITH LEVER AND CONNECTIONS.

Application filed February 17, 1920. Serial No. 359,411.

*To all whom it may concern:*

Be it known that I, AXEL A. ASPLUND, a citizen of Sweden, residing at Auburn, in the county of Cayuga and State of New York, have invented certain new and useful Improvements in Fuel-Valve Controls with Levers and Connections; and I do hereby declare the following to be a full, clear, and exact description of the invention, such as will enable others skilled in the art to which it appertains to make and use the same.

This invention relates to improvements in internal combustion engines of the Diesel type. More particularly it relates to a control mechanism for the fuel valves and is one of a series of applications simultaneously filed, to-wit: 359,410; 359,412; 359,-413; 359,414; 359,415; 359,416, to which, reference will be hereinafter made with regard to particular features.

The object of the present invention is to provide an improved means for regulating the lift of the fuel valves.

A further object is to provide such a mechanism in association with a general starting and maneuvering mechanism as will hereinafter more particularly appear.

The invention consists in the novel construction, arrangement and combination of parts, as hereinafter more particularly described and claimed.

Five sheets of drawings accompany this specification as part thereof, in which like reference characters indicate like parts throughout.

Figure 4 is an enlarged detail view partly in section of the fuel valve and its operating mechanism.

Figure 5 is a small diagrammatic view indicating the operation of control lever 67.

Figures 6–7 are detail views of the valve lift control lever.

Figure 8 is a vertical sectional view showing the starting lever and its immediate connections.

Fig. 9 is an elevation of the parts shown in Fig. 5, taken at right angles to Fig. 5.

Figure 1:
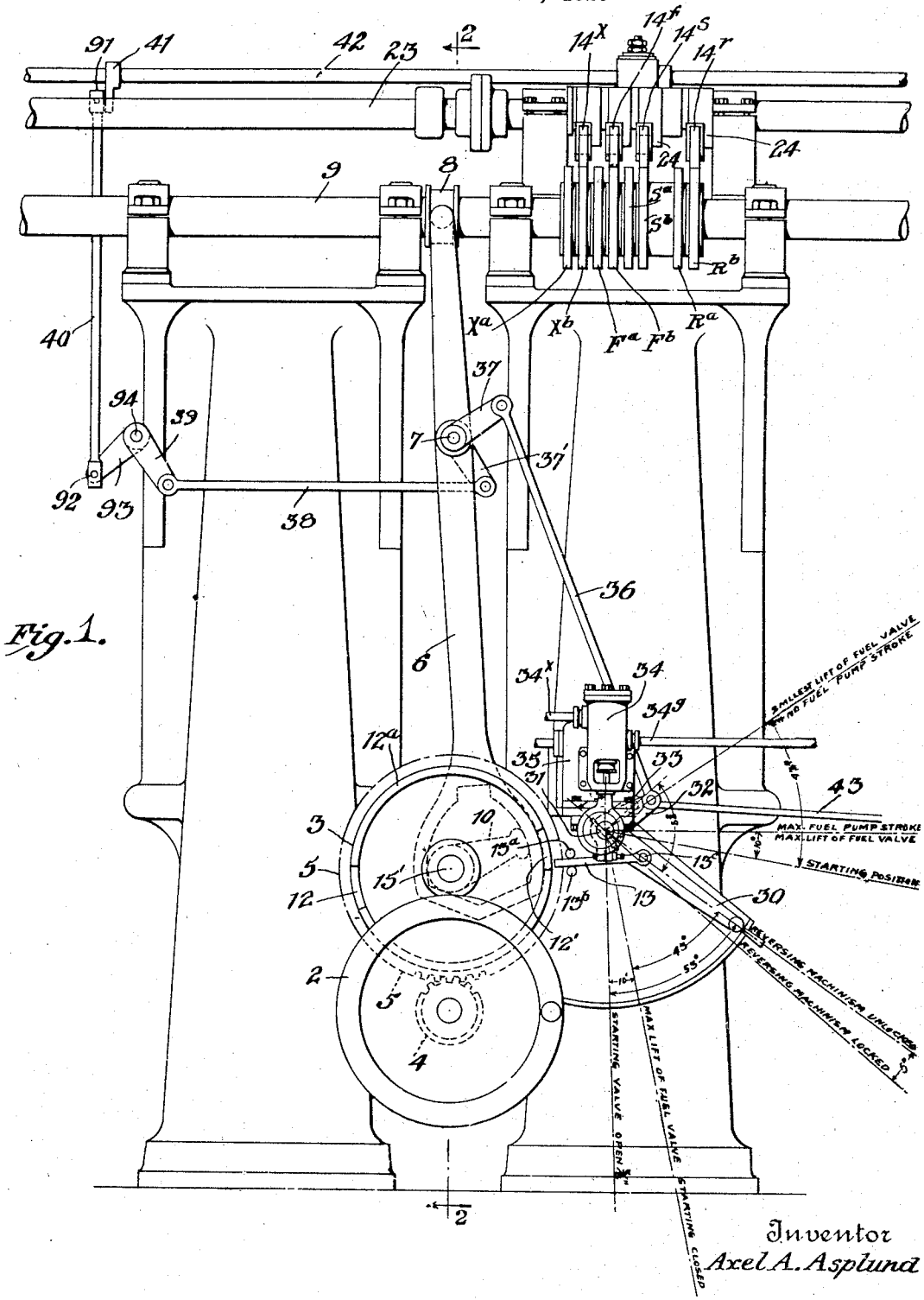
Figure 1 is a front elevation of a portion of a Diesel engine showing the application of the present invention.
Figure 2:
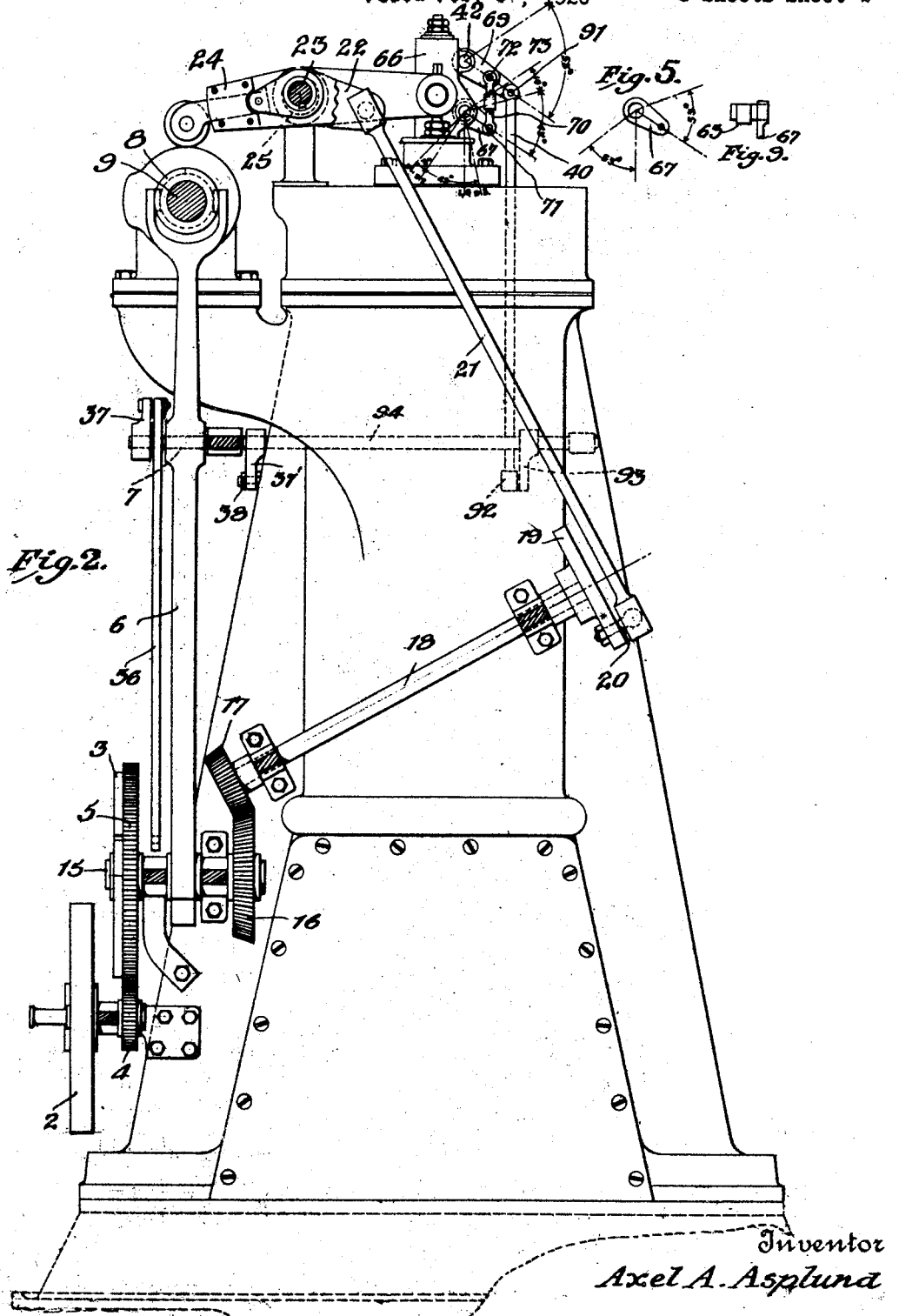
Figure 2 is a transverse vertical view taken on the line 2—2 of Figure 1.

In the control of a Diesel engine it is desirable that the fuel valves located on respective cylinders be regulated in a predetermined relation to the supply of the fuel and injection air and also in predetermined relation to the supply of starting air and the operation of the reversing mechanism, with its accompanying shifting of the operating cams. In accordance with the applicant's invention, a starting lever 30 is provided mounted upon a stub shaft 31 adapted to control an injection air valve 34, a starting air valve 35, the stroke of fuel pumps (not shown) as by a lever 33 and connecting rod 43 and the fuel valves 66, as by the mechanism hereinafter more particularly described. The reversing mechanism is operated by means of a hand wheel 2 geared to a rotor 3 operating lever 6 and cam shaft 9. Upon this cam shaft are mounted cams; $X^a$, $X^b$; $F^a$, $F^b$; $S^a$, $S^b$; $R^a$, $R^b$, controlling respectively exhaust valves, fuel valves, starting air valves and atmospheric air valves of the engine. These cams contact with levers $14^x$, $14^f$, $14^s$ and $14^r$, which are mounted on eccentrics 25 secured to a shaft 23 which shaft is adapted to be rotated by a lever 22 connected as by rod 21 and pivot 20 with a dish 19 secured to a shaft 19 adapted to be rotated by gears 17 and 16 from 15 to which is secured rotor 3. By means of this structure rotation of rotor 3 by handwheel 2 will operate to shift eccentrics 25 upon which the cam levers 14 are mounted to elevate said levers from the cams during the shifting operation and return same to contacting positions at the conclusion of this operation. As is more fully described in application, Serial No. 359,412, rotor 3 and starting lever 30 are interconnected by a locking mechanism comprising a bolt 13 passing through guide rollers $13^a$—$13^b$ and adapted to enter slots 12 and 12' in an annulus carried by rotor 3. It will thus be apparent that to start, stop and reverse an engine equipped with applicant's invention, all the operations are performed by the two manually operated parts, hand wheel 2 and lever 30.

Secured to stub shaft 31 is a lever 32, pivotally connected to a connecting rod 36 connected to bell crank 37—37'.

Figure 3:
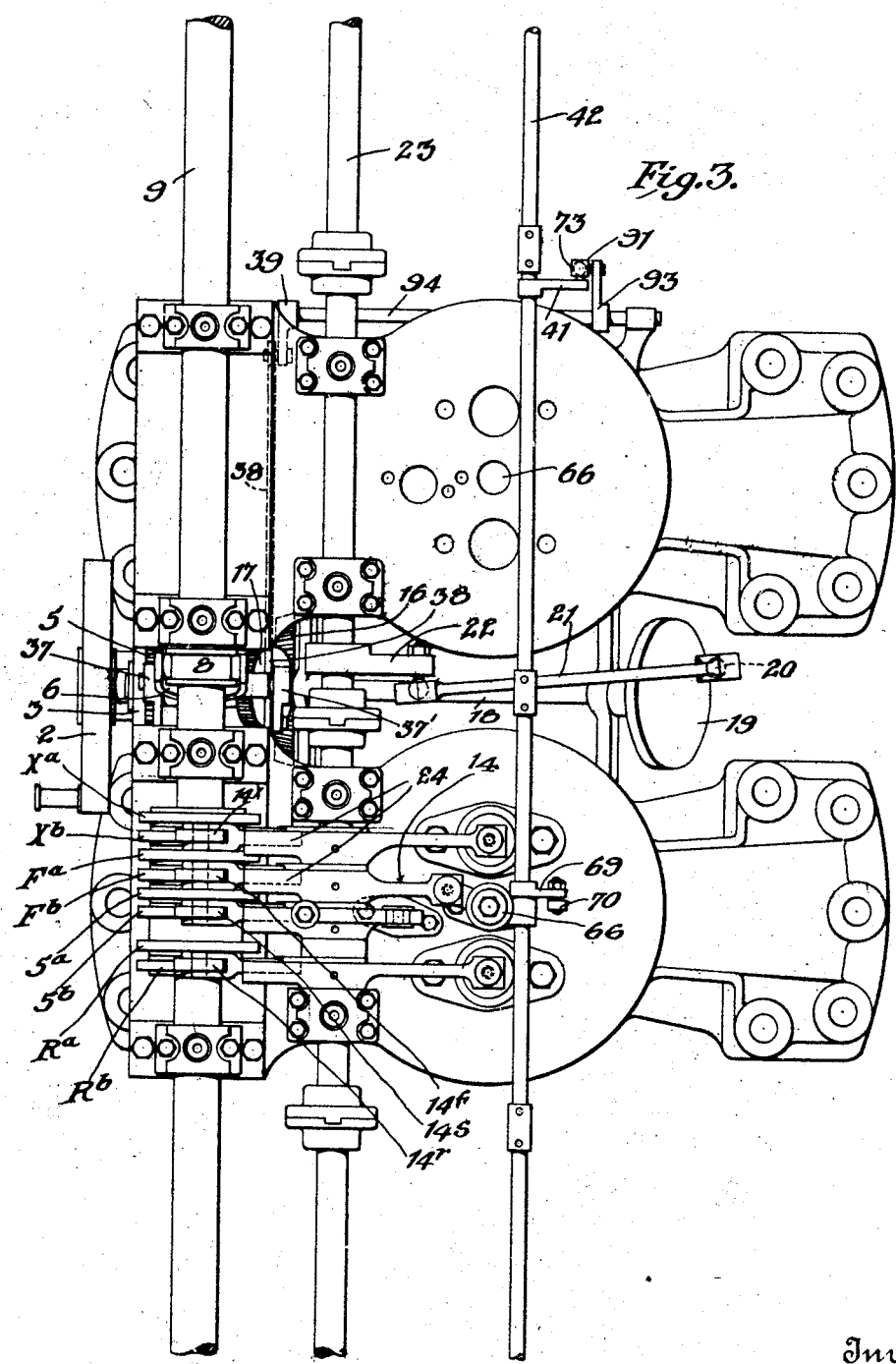
Figure 3 is a plan view.

A connecting rod 38 connects 37' of the bell crank to lever 39 which is secured to a shaft 94 extending rearwardly between the cylinders of the engine and upon which is mounted a lever 93 which is in turn pivotally connected as at 92 to a connecting rod 40 operating a lever pivotally connected as at 91 to a lever 41 secured upon a lever control shaft 42 extending longitudinally of the engine. Fuel valves mounted in the heads of each of the cylinders are similarly operated from the shaft 42 by a mechanism which will be described in detail with reference to one cylinder as illustrated in Figure 3. Upon shaft 42 adjacent fuel valve 66 is secured a lever 69 to the end of which as at 72 is pivotally connected an adjustable link 70, the other end of which is pivotally secured as at 71 to a valve lift control lever 67 (see Fig. 6). This valve lift control lever is provided with a laterally disposed stub axle which may be keyed thereto as at 68 and which is provided with an eccentric bearing 63. This lever is supported by bracket 65 from housing of valve 66 and the valve operating lever 61 is pivotally supported upon eccentric bearing 63. Valve operating lever 61 is provided with a hardened contact plate 75 adapted to engage stop 76 upon stem 55 of the fuel valve 66 which is normally elevated by means of spring 77, thus holding valve 60 in a closed position. The free end of valve lever 61 is connected by a link 78 to the cam operated lever 14 which, as is fully described in my copending applications 359,410 and 359,415, is operated by the eccentric cams, $F^a$ $F^b$, engaging rollers mounted thereon.

Link 78 connecting levers 61 and 14 is provided with pivoted connections which are shown as comprising pivoted bearings 87 and 82 mounted in the respective levers through which the link 78 is passed and secured by nuts 88 and 84.

In operation the swinging of starting lever 30 will by means of the levers and connecting rods 32, 36, 38, 40 operate to rotate fuel valve lift control shaft 42 which in turn will operate levers 69, thus operating to depress valve lift control levers 67, thus rotating eccentrics 63 upon which are pivotally mounted valve levers 61. It will thus be seen that by the proper adjustment of these respective levers, the movement of the starting lever 30 will be reflected ultimately in the rotation of eccentric 63 to bring the throw of said eccentric from a normally horizontal position in the starting position of lever 30 to a downwardly directed position illustrated in Figure 4, corresponding to the position of starting lever 30, which position of the eccentric will be reached when starting lever 30 has passed the 45° movement and between that point and its full 53° stroke, as indicated diagrammatically in Figure 1. Such a depression of the eccentric 63 which is the pivotal support for valve operating lever 61 increases the effective stroke applied to said lever 61 by cam operated lever 14. It will also be noted that through this construction the variation of this regulation of the stroke of valve operating lever 61 is gradual from the minimum to the maximum positions being secured by the gradual rotation and lowering of the centre of the eccentric 63.

Having thus fully described my invention, I claim:

1. In a control mechanism for explosive engines having cam operated valves, a rotor, means for shifting the cams operated by said rotor, means for raising the cam levers during the shifting of the cams operated by said rotor, means for regulating the valves and interlocking means between said rotor and said valve regulating means.

2. In a control mechanism for explosive engines, a starting lever and a rotor, cam shifting means operated by the rotor, cam lever lifting means operated by the rotor, valve regulating means operated by the starting lever and means for interlocking said rotor and starting lever.

3. In a control mechanism for explosive engines having cam operated fuel valves the combination of cam shifting means, cam levers, valve levers connected with said cam levers, both said cam levers and valve levers eccentrically mounted, means including a rotor operative to shift the cams and rotate the eccentric mountings of the cam levers, a starting lever operative of the eccentric mountings of the valve levers and means interlocking the rotor and starting lever.

4. In a control mechanism for explosive engines having cam operated fuel valves the combination of cam shifting means, cam levers, valve levers adjustably connected with said cam levers, both said cam levers and valve levers eccentrically mounted, means including a rotor operative to shift the cams and rotate the eccentric mountings of the cam levers, a starting lever operative of the eccentric mountings of the valve levers and means interlocking the rotor and starting lever.

In testimony whereof I affix my signature.

AXEL AUGUST ASPLUND.